(12) United States Patent
Kobayashi et al.

(10) Patent No.: US 11,081,256 B2
(45) Date of Patent: Aug. 3, 2021

(54) COMPOSITE CABLE PAIR

(71) Applicant: SUMITOMO WIRING SYSTEMS, LTD., Mie (JP)

(72) Inventors: Kenta Kobayashi, Mie (JP); Akira Kitabata, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 318 days.

(21) Appl. No.: 16/357,804

(22) Filed: Mar. 19, 2019

(65) Prior Publication Data

US 2019/0304632 A1 Oct. 3, 2019

(30) Foreign Application Priority Data

Mar. 28, 2018 (JP) .............................. JP2018-062475

(51) Int. Cl.
*H01B 7/00* (2006.01)
*B60R 16/02* (2006.01)
*H01B 11/02* (2006.01)

(52) U.S. Cl.
CPC .......... *H01B 11/02* (2013.01); *B60R 16/0207* (2013.01); *H01B 7/0045* (2013.01)

(58) Field of Classification Search
CPC ........ H01B 11/02; H01B 7/0045; H01B 7/00; H01B 7/18; H01B 11/00; H01B 11/04; B60R 16/0207; B60R 16/02; B60R 16/0215; B60R 16/00
USPC ......... 174/68.1, 68.3, 70 C, 135, 72 A, 73.1, 174/74 R, 96, 137, 138, 70 R; 248/68.1, 248/49
See application file for complete search history.

(56) References Cited

U.S. PATENT DOCUMENTS

| | | | | |
|---|---|---|---|---|
| 4,781,433 A * | 11/1988 | Arroyo | ................ | G02B 6/4403 385/142 |
| 6,747,214 B2 * | 6/2004 | Goeblmaier | ......... | H01B 7/0258 174/110 R |
| 7,534,962 B2 * | 5/2009 | Scheel | ...................... | C09J 7/25 174/110 R |
| 2017/0253198 A1 | 9/2017 | Hayakawa et al. | | |

FOREIGN PATENT DOCUMENTS

JP 2017-157521 9/2017

* cited by examiner

*Primary Examiner* — Angel R Estrada
(74) *Attorney, Agent, or Firm* — Greenblum & Bernstein, P.L.C.

(57) ABSTRACT

Provided is a composite cable pair with which it is possible to reduce the difference in durability between a right-wheel composite cable and a left-wheel composite cable. A composite cable pair includes a right-wheel composite cable and a left-wheel composite cable. One end of the composite cable is fixed to a cable fixing portion on the vehicle body side or the chassis side of an automobile, and the other end thereof is fixed to a cable fixing portion on the right wheel side. One end of the composite cable is fixed to a cable fixing portion on the vehicle body side or the chassis side of the automobile, and the other end thereof is fixed to a cable fixing portion on the left wheel side. Wires of the respective wire bundles of the composite cable and the composite cable are twisted in twisting directions that are opposite to each other so that the twisting is tightened, without loosening, by an operation of the handle.

7 Claims, 4 Drawing Sheets

Fig. 4A
Fig. 4B
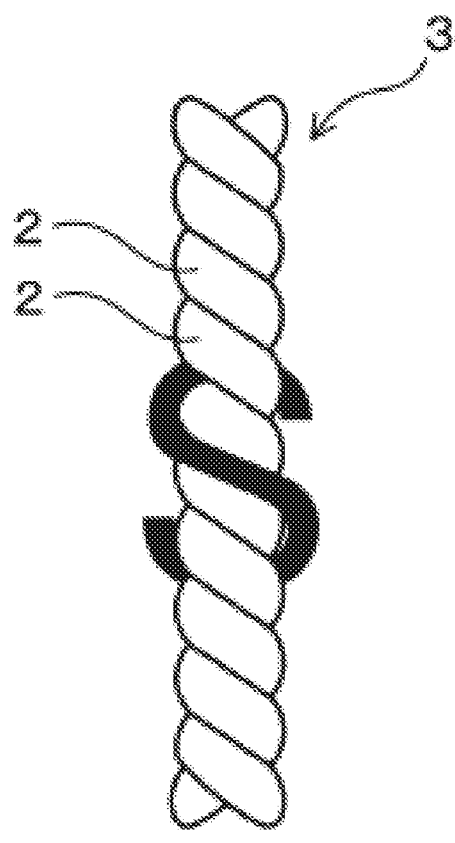
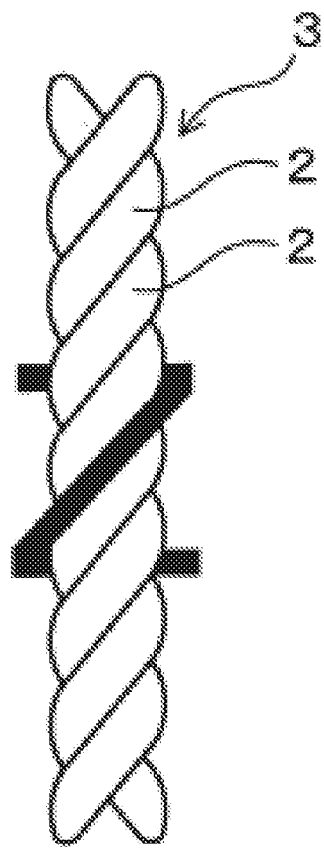

COMPOSITE CABLE PAIR

TECHNICAL FIELD

The present invention relates to a composite cable pair.

BACKGROUND ART

In recent years, electric braking that electrically controls brakes and electric parking braking that electrically controls parking brakes have been attracting attention in the automobile filed. For example, JP 2017-157521A discloses a composite cable for electric braking and electric parking braking that includes a wire bundle including two signal lines and two power lines that are twisted together. In electric braking and electric parking braking, a composite cable of this type is usually disposed in the suspension of the front-right wheel, and a composite cable having the same configuration as that on the front-right wheel side is also disposed in a suspension of a front-left wheel. A pair of these composite cables constitute a composite cable pair.

JP 2017-157521A is an example of related art.

SUMMARY OF THE INVENTION

However, the conventional technique has the following problems. That is, for a pair of composite cables constituting the conventional composite cable pair, the wires that form each of the wire bundles are twisted together by either S-twisting or Z-twisting. Accordingly, when the handle of an automobile is steered to the right or to the left, one of the composite cables is twisted in a direction tightening the twist whereas the other composite cable is twisted in a direction of loosening the twist. When the composite cables are repeatedly twisted in the direction tightening the twist and the direction of loosening the twist, the durability of the wires is reduced. Accordingly, there will be a difference in durability between the left and right composite cables, resulting in a reduction in the reliability of the composite cable pair. In addition, if the material of the wires of one of the composite cables is changed to a material having excellent twist resistance in order to eliminate the difference in durability between the left and right composite cables, the costs will be increased accordingly.

The present invention has been made in view of the foregoing circumstances, and provides a composite cable pair with which it is possible to reduce the difference in durability between a right-wheel composite cable and a left-wheel composite cable that are disposed in a suspension of a pair of right and left wheels that move in accordance with an operation of a handle of an automobile.

An aspect of the present invention is directed to a composite cable pair that is disposed in a suspension of a pair of right and left wheels that move in accordance with an operation of a handle of an automobile, including:

a right-wheel composite cable whose one end is fixed to a first cable fixing portion on a vehicle body side or a chassis side of the automobile, and whose other end is fixed to a second cable fixing portion on the right wheel side; and a left-wheel composite cable whose one end is fixed to a third cable fixing portion on the vehicle body side or the chassis side of the automobile, and whose other end is fixed to a fourth cable fixing portion on the left wheel side, wherein each of the right-wheel composite cable and the left-wheel composite cable includes a wire bundle including a plurality of wires that are twisted together, and the wires of the respective wire bundles are twisted in twisting directions that are opposite to each other so that the twisting is tightened, without loosening, by an operation of the handle.

With such a composite cable pair, the wires of the wire bundle of the right-wheel composite cable and the wires of the wire bundle of the left-wheel composite cable are twisted in twisting directions that are opposite to each other so that the twisting is tightened, without loosening, by an operation of the handle. Accordingly, with the composite cable pair, when the handle of the automobile is steered to the right or to the left, the wires of the right-wheel composite cable and the left-wheel composite cable are twisted in the direction tightening, without loosening, the twist. Wires are less likely to undergo reduction in durability when they are twisted in the direction tightening the twist. Therefore, with the composite cable pair, it is possible to reduce the difference in durability between the right-wheel composite cable and the left-wheel composite cable that are disposed in the suspensions of the pair of right and left wheels that move in accordance with an operation of the handle of the automobile. Consequently, the reliability of the composite cable pair is increased.

BRIEF DESCRIPTION OF THE DRAWINGS

FIGS. 4A and 4B are explanatory diagrams illustrating directions of twisting the wires of a wire bundle.

EMBODIMENTS OF THE INVENTION

Embodiment 1

Figure 1A:
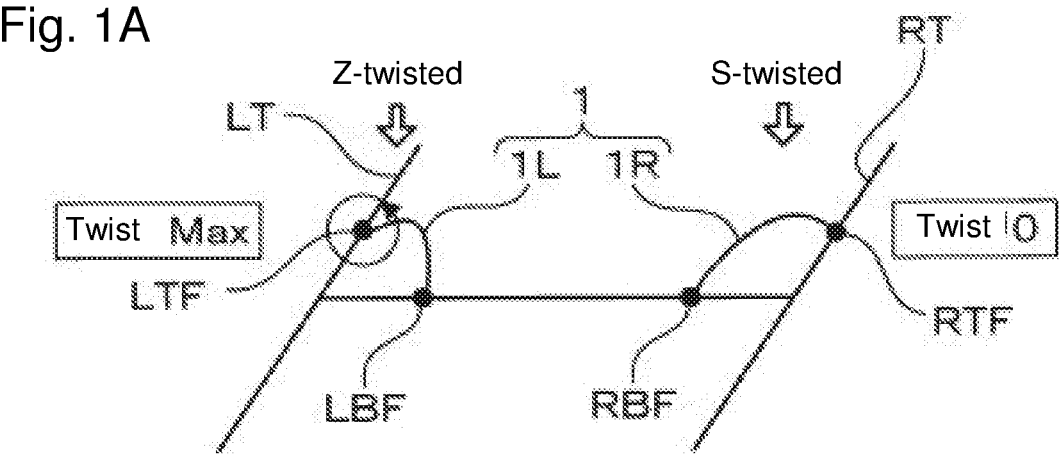
FIGS. 1A to 1C are explanatory diagrams schematically illustrating a composite cable pair according to Embodiment 1.
Figure 1B:
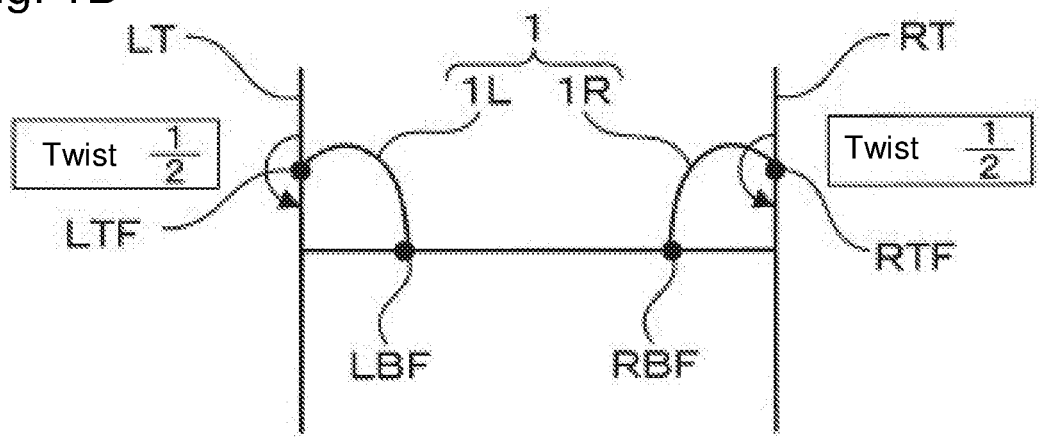
Figure 1C:
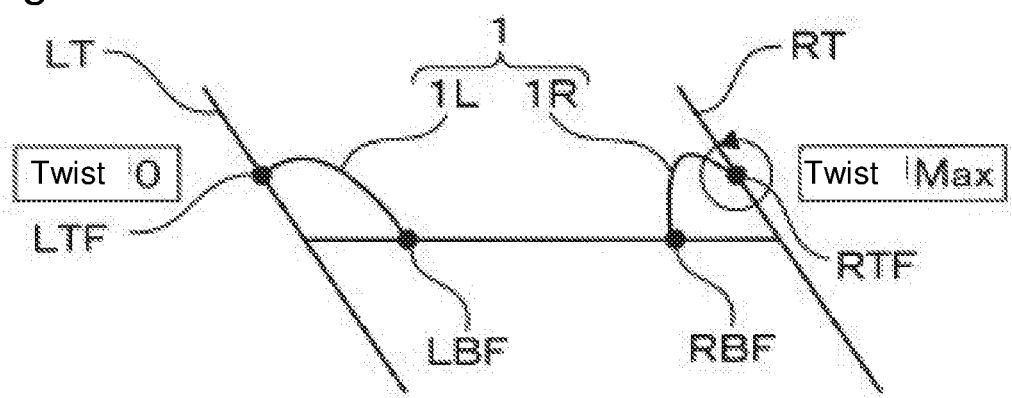

A composite cable pair according to Embodiment 1 will be described with reference to FIGS. 1A to 4B. As illustrated in FIGS. 1A to 1C, a composite cable pair 1 according to the present embodiment is disposed in a suspension of a pair of right and left wheels RT and LT that move in accordance with an operation of a handle (not shown) of an automobile. Note that the upper side in FIGS. 1A to 1C is the front of the automobile. The present embodiment is assumed to be applied to a commonly used automobile, and will be described taking the right wheel RT as a front-right wheel and the left wheel LT as a front-left wheel. Although it is not very common, the four-wheel steering technique 4WS (4 wheel steering) has also been developed as a steering technique for automobiles. When applied to the suspensions of such an automobile, the above-described right wheel may not only be the front-right wheel, but may also be a rear-right wheel, and the left wheel may not only be the front-left wheel, but may also be a rear-left wheel.

As illustrated in FIGS. 1A to 1C, the composite cable pair 1 includes a right-wheel composite cable 1R and a left-wheel composite cable 1L. One end of the right-wheel composite cable 1R is fixed to a first cable fixing portion RBF on the vehicle body side or the chassis side of the automobile, and the other end thereof is fixed to a second cable fixing portion RTF on the right wheel RT side. Meanwhile, one end of the left-wheel composite cable 1L is fixed to a third cable fixing portion LBF on the vehicle body side or the chassis side of the automobile, and the other end thereof is fixed to a fourth cable fixing portion LTF on the left wheel LT side.

In the present embodiment, the right-wheel composite cable 1R and the left-wheel composite cable 1L are configured to be used for an electric brake or electric parking brake of the automobile. In the present embodiment, the other end of the right-wheel composite cable 1R can be fixed with a fixation member, such as a bracket, to a component such as a lower arm, an upper arm, a right wheel supporting member, a tie rod, a knuckle-side fulcrum portion, or a rear-side arm portion in a right-side front suspension device (not shown) of the automobile. Likewise, the other end of the left-wheel composite cable 1L can be fixed with a fixation member, such as a bracket, to a component such as a lower arm, an upper arm, a left wheel supporting member, a tie rod, a knuckle-side fulcrum portion, or a rear-side arm portion in a left-side front suspension device (not shown) of the automobile. Note that any of various known suspension devices can be used as the suspension device.

Figure 2:
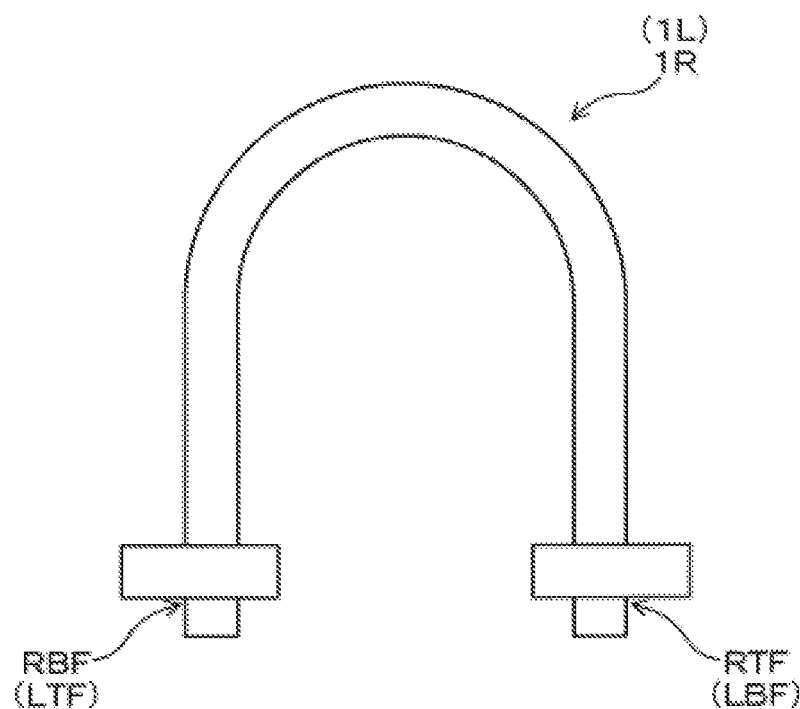
FIG. 2 is an explanatory diagram schematically showing an example of fixation of a right-wheel composite cable and a left-wheel composite cable of the composite cable pair according to Embodiment 1.

In the present embodiment, it is preferable that the right-wheel composite cable 1R and the left-wheel composite cable 1L are bent protruding upward (in an inverse "U" shape) as illustrated in FIG. 2. With this configuration, as compared with when they are disposed in a state of being bent protruding downward (in a "U" shape), the right-wheel composite cable 1R and the left-wheel composite cable 1L can be more easily prevented from being subjected to snow accumulation or icing, and more easily prevented from being damaged by stones, pebbles and the like thrown up by the right wheel RT and the left wheel LT.

Figure 3:
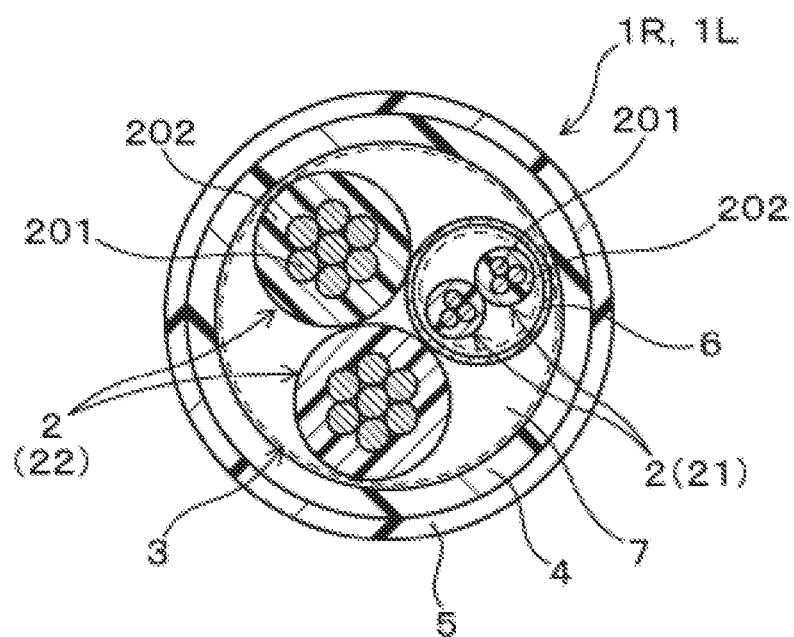
FIG. 3 is a cross-sectional view schematically showing an example of the cross section perpendicular to cable axes of the right-wheel composite cable and the left-wheel composite cable of the composite cable pair according to Embodiment 1.

As illustrated in FIG. 3, each of the right-wheel composite cable 1R and the left-wheel composite cable 1L includes a wire bundle 3 including a plurality of wires 2 that are twisted together. FIG. 3 shows an example in which the wires 2 that form a wire bundle 3 specifically include a pair of signal lines 21 and a pair of power lines 22. In addition, the outer circumference of the wire bundle 3 is covered by a sheath 5. Note that the number of wires 2 such as signal lines 21 and power lines 22 is not limited to the number shown in FIG. 3. The wires 2 may be covered by a shield conductor 6. Note that FIG. 3 shows an example in which the pair of signal lines 21 is covered by the shield conductor 6. FIG. 3 shows an example in which an interposed layer 4 that covers the wire bundle 3 is provided between the wire bundle 3 and the sheath 5, and a space 7 is provided between the inner side surface of the interposed layer 4 and the wires 2. Note that FIG. 3 shows an example in which the interposed layer 4 has a certain thickness. The interposed layer 4 may be replaced by a press winding member (not shown) such as a press winding tape. The inner side surface of the interposed layer 4 and the press winding member may be configured to come into contact with the surface of the wires 2.

Each of the wires 2 may include a conductor 201 and an insulator 202 that covers the outer circumference of the conductor 201. The conductor 201 may include a plurality of bare metal strands that are twisted together. The bare metal strands may be made of copper or a copper alloy, or aluminum or an aluminum alloy, for example. The insulator 202 may be made of cross-linked polyethylene (PE) or the like.

Here, in the present embodiment, the wires 2 of the wire bundle 3 of the right-wheel composite cable 1R are S-twisted (right-twisted) as illustrated in FIG. 4A. On the other hand, the wires 2 of the wire bundle 3 of the left-wheel composite cable 1L are Z-twisted (left-twisted) as illustrated in FIG. 4B. That is, the wires 2 of the respective wire bundles 3 are twisted in twisting directions that are opposite to each other.

Specifically, in the present embodiment, the right-wheel composite cable 1R is arranged to have its natural length when the right wheel RT and the left wheel LF are turned fully to the right by an operation of the handle, as illustrated in FIG. 1A. Note that the expression that the composite cable has its natural length means that the composite cable has the length of its raw state, i.e., the length in the state in which it is not twisted by torsional force. On the other hand, the left-wheel composite cable 1L is arranged to have its natural length when the right wheel RT and the left wheel LT are turned fully to the left by an operation of the handle, as illustrated in FIG. 1C. With this configuration, the wires 2 of the wire bundle 3 of the right-wheel composite cable 1R are maximally twisted by a torsional force generated by steering the wheels when the right wheel RT and the left wheel LT are turned fully to the left by an operation of the handle, as illustrated in FIG. 1C. On the other hand, the wires 2 of the wire bundle 3 of the left-wheel composite cable 1L are maximally twisted by a torsional force generated by steering the wheels when the right wheel RT and the left wheel LT are turned fully to the right by an operation of the handle, as illustrated in FIG. 1A. Accordingly, with the above-described configuration, the wires 2 of the wire bundles 3 of the right-wheel composite cable 1R and the left-wheel composite cable 1L are twisted in a direction of reliably tightening, without loosening, the twist by an operation of the handle.

Note that the actual attachment of the right-wheel composite cable 1R and the left-wheel composite cable 1L may be performed such that the right-wheel composite cable 1R has its natural length and the left-wheel composite cable 1L is maximally twisted by steering the wheels within the movable range of the wheels when the right wheel RT and the left wheel LT are turned fully to the right by an operation of the handle, as illustrated in FIG. 1A, for example. Furthermore, the actual attachment of the right-wheel composite cable 1R and the left-wheel composite cable 1L may be performed such that the right-wheel composite cable 1R is maximally twisted by steering the wheels within the movable range of the wheels and the left-wheel composite cable 1L has its natural length when the right wheel RT and the left wheel LT are turned fully to the left by an operation of the handle, as illustrated in FIG. 1C, for example.

In the present embodiment, the wires 2 of the wire bundles 3 are all twisted in the direction tightening the twist when the handle is operated such that the right wheel RT and the left wheel LT are in a straight traveling state, as illustrated in FIG. 1B. With this configuration, the composite cable pair is subjected to bending in a state in which the twist is tightened, and, therefore, the present embodiment is advantageous in that the durability is less likely to be reduced, for example. Note that in the present embodiment, the wires 2 of the wire bundles 3 are all twisted in the direction tightening the twist to a degree that is half that of the maximally twisted state when the right wheel RT and the left wheel LT are in the straight traveling state by an operation of the handle.

With the composite cable pair 1 of the present embodiment, the wires 2 of the right-wheel composite cable 1R and the left-wheel composite cable 1L are twisted in the direction tightening, without loosening, the twist when the handle of the automobile is steered to the right or to the left. The wires 2 are less likely to be subjected to reduction in durability when they are twisted in the direction tightening the twist. Therefore, with the composite cable pair 1 of the present embodiment, the difference in durability between the right-wheel composite cable 1R and the left-wheel composite cable 1L that are disposed in the suspensions of the pair of right and left wheels RT and LT that move in accordance with an operation of the handle of the automobile. Accordingly, the reliability of the composite cable pair 1 is increased.

Note that when the conductor 201 of each wire 2 includes a plurality of bare metal strands, it is preferable that the bare metal strands are twisted together in the same twisting direction as the twisting direction of the wires 2 of the wire bundle 3. With this configuration, the twist of the bare metal strands is less likely to be loosened, thus making it possible to more easily prevent breakage of the bare metal strands through buckling. When some of the wires 2 that form the wire bundle 3 are twisted together (when they are plied), it is preferable that these wires 2 are twisted together in the same twisting direction as the twisting direction of the wires 2 of the wire bundle 3. This configuration makes the ply less likely to be loosened, and, therefore, the above-described effects can be more reliably achieved.

Embodiment 2

A composite cable pair according to Embodiment 2 will be described with reference to FIGS. 5A to 5C. Note that the upper side in FIGS. 5A to 5C is the front of an automobile.

Figure 5A:
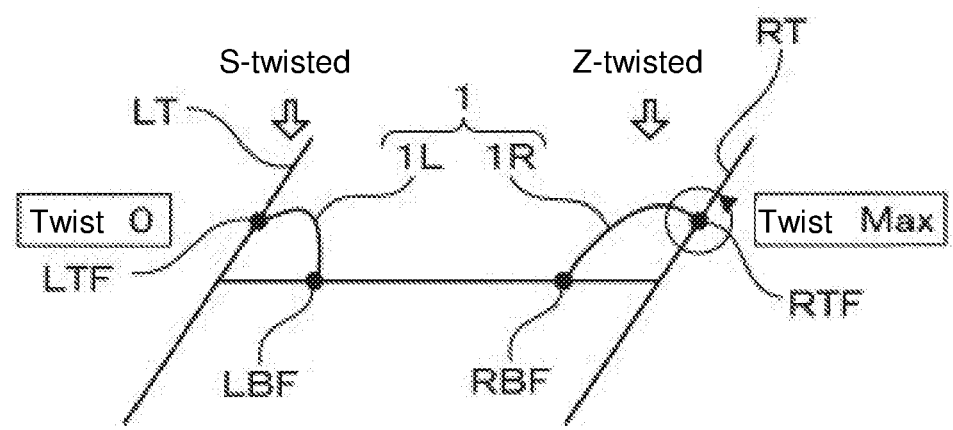
FIGS. 5A to 5C are explanatory diagrams schematically illustrating a composite cable pair according to Embodiment 2.
Figure 5B:
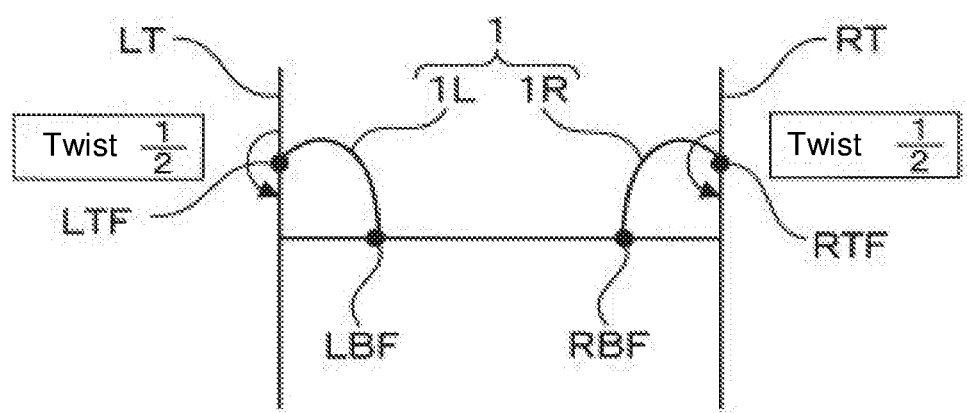
Figure 5C:
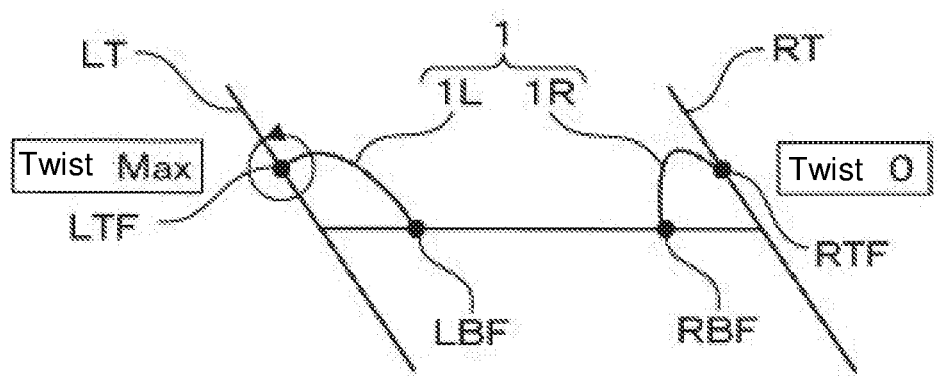

As illustrated in FIGS. 5A to 5C, for a composite cable pair 1 according to the present embodiment, wires 2 of a wire bundle 3 of a right-wheel composite cable 1R are Z-twisted (left-twisted) as illustrated in FIG. 4B. On the other hand, wires 2 of a wire bundle 3 of a left-wheel composite cable 1L are S-twisted (right-twisted) as illustrated in FIG. 4A. That is, the wires 2 of the respective wire bundles 3 are twisted in twisting directions that are opposite to each other.

Specifically, in the present embodiment, the right-wheel composite cable 1R is arranged to have its natural length when a right wheel RT and a left wheel LT are turned fully to the left by an operation of the handle, as illustrated in FIG. 5C. On the other hand, the left-wheel composite cable 1L is arranged to have its natural length when the right wheel RT and the left wheel LT are turned fully to the right by an operation of the handle, as illustrated in FIG. 5A. With this configuration, the wires 2 of the wire bundle 3 of the right-wheel composite cable 1R are maximally twisted by a torsional force generated by steering the wheels when the right wheel RT and the left wheel LT are turned fully to the right by an operation of the handle, as illustrated in FIG. 5A. On the other hand, the wires 2 of the wire bundle 3 of the left-wheel composite cable 1L are maximally twisted by a torsional force generated by steering the wheels when the right wheel RT and the left wheel LT are turned fully to the left by an operation of the handle, as illustrated in FIG. 5C. Accordingly, with the above-described configuration, the wires 2 of the wire bundles 3 of the right-wheel composite cable 1R and the left-wheel composite cable 1L are reliably twisted only in a direction tightening the twist by an operation of the handle. The rest of the configuration and the operations and effects are the same as those of Embodiment 1.

WORKING EXAMPLES

A composite cable R and a composite cable L each having the cross section shown in FIG. 3 were prepared. The conductor cross-sectional area of the signal lines of each of the composite cables R and L is 0.3 mm$^2$, and the conductor cross-sectional area of the power lines is 2.5 mm$^2$. The wires of the wire bundle of the composite cable R are S-twisted (right-twisted), and the wires of the wire bundle of the composite cable L are Z-twisted (left-twisted).

Each of the composite cables was brought in a state of being bent in an inverse "U" shape, and one end of the cable was fixed to a fixing portion. The other end of the cable was fixed to a movable portion capable of vertically vibrating and capable of rotating at a predetermined steering angle. Note that this fixing state simulates a case where one end of the cable is fixed to the vehicle body or the chassis and the other end is fixed to a portion around the wheel. In the aforementioned simulation, the fixed point at the fixing portion and the center position of the vertical vibrations of the movable portion are set at the same height, and the distance therebetween was 100 mm. The cable length was 300 mm. The vertical movement amount of the movable portion was ±80 mm. The steering angle of the movable portion was ±60°.

Under the above-described conditions, the movable portion was steered within the above-described steering angle range while being vertically moved, and the number of times of operations performed until the conductor of each of the cables had undergone breakage was counted. Note that an operation during which the movable portion was moved from the center position, the upper-limit position, the center position, the lower-limit position, and the center position in this order was defined as a single operation. In a single operation, the movable portion is steered from 0°→+60°→0° in Pattern 1, and from 0°→−60°→0° in Pattern 2.

According to the results of the above-described tests, the number of times of operations performed for the composite cable R was 4000000 or more for the steering of Pattern 1, and 1500000 for the steering of Pattern 2. The number of times of operations performed for the composite cable L was 1500000 for the steering of Pattern 1, and 4000000 or more for the steering of Pattern 2. The results demonstrate that the durability of the cables is less likely to be reduced when the cables are subjected to bending in a state in which the twist is tightened. Also, it was confirmed that the difference in durability between a right-wheel composite cable and a left-wheel composite cable that are disposed in a suspension of a pair of right and left wheels that move in accordance with an operation of a handle of an automobile can be reduced by using a wire bundle that is twisted in a direction tightening the twist for both the right wheel and the left wheel.

The present invention is not limited to the above-described embodiments and working examples, and various modification can be made without departing from the gist of the present invention. In addition, the components described in the embodiments and the working examples may be combined freely.

LIST OF REFERENCE NUMERALS

1: Composite cable pair
RT: Right wheel

LT: Left wheel
1R: Right-wheel composite cable
1L: Left-wheel composite cable
RBF: First cable fixing portion
RTF: Second cable fixing portion
LBF: Third cable fixing portion
LTF: Fourth cable fixing portion
2: Wire
3: Wire bundle

What is claimed is:

1. A composite cable pair that is disposed in a suspension of a pair of right and left wheels that move in accordance with an operation of a handle of an automobile, comprising:
    a right-wheel composite cable having one end fixed to a first cable fixing portion on a vehicle body side or a chassis side of the automobile, and having another end fixed to a second cable fixing portion on the right wheel side; and
    a left-wheel composite cable having one end fixed to a third cable fixing portion on the vehicle body side or the chassis side of the automobile, and having another end fixed to a fourth cable fixing portion on the left wheel side,
    wherein each of the right-wheel composite cable and the left-wheel composite cable includes a wire bundle including a plurality of wires that are twisted together, and
    the wires of the respective wire bundles of the right-wheel composite cable and the left-wheel composite cable are twisted in twisting directions that are opposite to each other so that the twisting is tightened, without loosening, by an operation of the handle.

2. The composite cable pair according to claim 1, wherein,
    when the handle is operated such that the right wheel and the left are in a straight traveling condition, the wires of the wire bundles are all in a twisted condition.

3. The composite cable pair according to claim 1, wherein
    the wires of the wire bundle of the right-wheel composite cable are S-twisted,
    the wires of the wire bundle of the left-wheel composite cable are Z-twisted,
    the right-wheel composite cable is arranged to have its natural length when the right wheel and the left wheel are turned fully to the right by an operation of the handle, and
    the left-wheel composite cable is arranged to have its natural length when the right wheel and the left wheel are turned fully to the left by an operation of the handle.

4. The composite cable pair according to claim 1, wherein
    the wires of the wire bundle of the right-wheel composite cable are Z-twisted,
    the wires of the wire bundle of the left-wheel composite cable are S-twisted,
    the right-wheel composite cable is arranged to have its natural length when the right wheel and the left wheel are turned fully to the left by an operation of the handle, and
    the left-wheel composite cable is arranged to have its natural length when the right wheel and the left wheel are turned fully to the right by an operation of the handle.

5. The composite cable pair according to claim 1, wherein the right wheel is a front-right wheel, and the left wheel is a front-left wheel.

6. The composite cable pair according to claim 1, wherein the right-wheel composite cable and the left-wheel composite cable are bent protruding upward.

7. The composite cable pair according to claim 1, wherein the right-wheel composite cable and the left-wheel composite cable are configured to be used for an electric brake or an electric parking brake of the automobile.

* * * * *